United States Patent
Wyborn et al.

(10) Patent No.: US 9,349,214 B2
(45) Date of Patent: May 24, 2016

(54) SYSTEMS AND METHODS FOR REPRODUCTION OF SHADOWS FROM MULTIPLE INCIDENT LIGHT SOURCES

(75) Inventors: Rowan Wyborn, Page (AU); Mathi Nagarajan, Nicholls (AU)

(73) Assignee: Take-Two Interactive Software, Inc., New York, NY (US)

( * ) Notice: Subject to any disclaimer, the term of this patent is extended or adjusted under 35 U.S.C. 154(b) by 952 days.

(21) Appl. No.: 12/195,399

(22) Filed: Aug. 20, 2008

(65) Prior Publication Data

US 2010/0045675 A1 Feb. 25, 2010

(51) Int. Cl.
*G06T 15/00* (2011.01)
*G06T 15/60* (2006.01)
(52) U.S. Cl.
CPC ...................................... *G06T 15/60* (2013.01)
(58) Field of Classification Search
CPC .............................. G06T 15/005; G06T 15/04
USPC ......................... 345/418, 422, 426, 428, 619
See application file for complete search history.

(56) References Cited

U.S. PATENT DOCUMENTS

| | | | | |
|---|---|---|---|---|
| 5,977,977 A | * | 11/1999 | Kajiya et al. | 345/418 |
| 6,252,608 B1 | * | 6/2001 | Snyder et al. | 345/473 |
| 6,760,024 B1 | * | 7/2004 | Lokovic et al. | 345/421 |
| 7,023,438 B2 | * | 4/2006 | Lokovic et al. | 345/426 |
| 7,233,332 B2 | * | 6/2007 | Lokovic et al. | 345/426 |
| 7,567,248 B1 | * | 7/2009 | Mark et al. | 345/426 |
| 7,817,823 B1 | * | 10/2010 | O'Donnell | 382/103 |
| 7,969,438 B2 | * | 6/2011 | Xie | 345/426 |

* cited by examiner

*Primary Examiner* — Phu K Nguyen
(74) *Attorney, Agent, or Firm* — Orrick Herrington & Sutcliffe, LLP

(57) ABSTRACT

Systems and methods are provided for simulating shadows in a scene. In an embodiment, two or more light sources that cast shadows from objects are identified. Each of those light sources is then assigned to a channel in a shadow mask buffer. The shadows are then accumulated into the shadow mask buffer and may be combined with corresponding lights to render the scene.

25 Claims, 4 Drawing Sheets

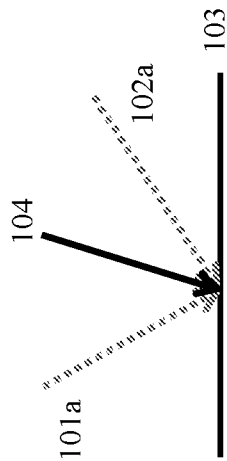
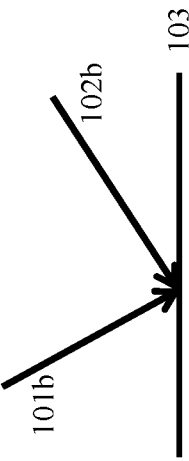
Fig. 1A
(Prior Art)
Fig. 1B
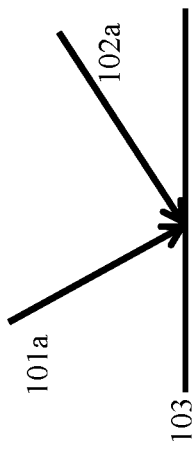
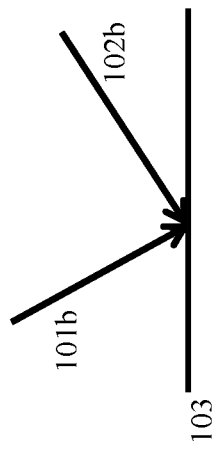

SYSTEMS AND METHODS FOR REPRODUCTION OF SHADOWS FROM MULTIPLE INCIDENT LIGHT SOURCES

FIELD OF THE INVENTION

The present invention relates generally to simulation and visualization of shadows using three-dimensional computer graphics and, more particularly, to systems and methods for producing shadows from multiple incident light sources using three-dimensional computer graphics.

BACKGROUND

Some manufacturers of video games, especially first-person shooter (FPS) video games that emulate the game world from the perspective of the player-character, strive to provide realistic interactive environments to enhance the gaming experience. For example, one such realism effect may include a depiction of shadows "caused" by one or more light sources. Where a single light source may cast shadows from many objects in a scene, the combined effect of many light sources acting upon the same object or objects is expectedly even more difficult to reproduce. Further complications include the use of different types of light, such as ceiling lights, flashlights, fire, and/or daylight, which can cause effectively different shadow patterns. And, the use of lights which change color, intensity, and geography (e.g., a sun setting) can cause effectively different shadow patterns. Further, even if a light source provided does not change, a moving object requires a change in the shadow pattern.

Existing techniques used to maintain shadows use directional encoding to approximate multiple incident lights, as shown in FIG. 1A. Where, for example, incident lights 101a and 102a strike an object 103 to create a shadow, existing technologies approximate the combined effect of incident lights 101a and 102a by using directional encoding to compute and apply the effect of hypothetical light source 104. This approximation, however, results in inferior mapping quality, especially on specular objects such as mirrors, water or metal, since shadows may block all or part of a specular. Moreover, this approximation limits the range and precision of shadows from high dynamic range (HDR) light sources, especially when lights may change intensity and color during game play.

Thus, there is a need for systems and methods that accurately reproduce dynamic shadows from many incident light sources in a real time environment.

BRIEF DESCRIPTION OF THE DRAWINGS

FIG. 1A demonstrates directional encoding used to approximate the effect of multiple incident lights, according to the prior art.

FIG. 1B demonstrates an analytical model that accurately reproduces the effect of each incident light, according to the present invention.

DETAILED DESCRIPTION

Example embodiments of the present invention involve methods and systems to accurately reproduce shadows in computer graphics. An example embodiment provides for simulating shadows from multiple incident light sources in three-dimensional computer graphics. Although example embodiments of the present invention are described herein in the context of a video game, other applications of the present invention will be apparent to those of ordinary skill in the art.

FIG. 1B demonstrates an analytical model that accurately reproduces the effect of each of multiple incident lights, according to the present invention. Where, for example, incident lights 101b and 102b strike an object to create a shadow, example embodiments of the present invention accurately reproduce how each of incident lights 101b and 102b affects any shadows cast from static or dynamic objects.

Example embodiments of the present invention use the binary space partitioning (BSP) method to pre-compute which sections are visible at a given time. As known in the art, BSP uses multiple intersecting planes to partition the scene into sectors. Each of the planes divides the space through which it passes into two spaces; thus, the multiple intersecting planes form convex polygons called leaves. In an example embodiment, the game further uses portals to manage which leaves are visible at a given time. This increases the system efficiency, since only visible leaves need be redrawn.

Figure 2:
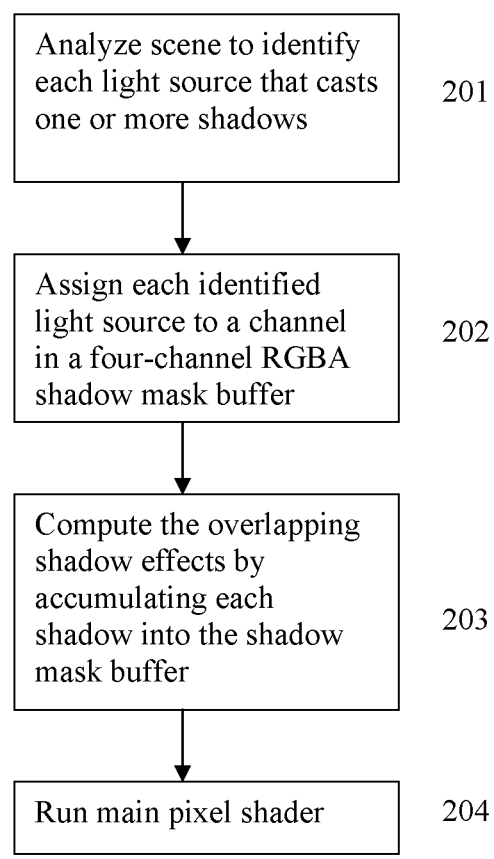
FIG. 2 shows a flowchart overview illustrating an example embodiment according to the present invention.

FIG. 2 shows a flowchart overview illustrating an example embodiment according to the present invention. Example embodiments of the present invention analyze the scene to find all shadow-casting light sources, assign each shadow-casting light source to a channel in a shadow mask buffer, compute the overlapping shadow effects by accumulating the shadows into the shadow mask buffer, and run the pixel shader to generate the scene with shadows.

In step 201, the scene is analyzed to identify each light source that casts one or more shadows. In an example embodiment of the invention, each light has been marked by the level designer to indicate whether the light should cast shadows. The lighting system then determines which BSP leaves would receive this light. In this way, for each BSP leaf, the system may pre-compute a list of shadow-casting lights that affect that leaf. During game play, the BSP and portal visibility system may traverse all visible leaves and, for each visible leaf, add the list of shadow-casting lights that affect that leaf into a global list.

The exact method for analyzing the scene to find all light sources casting shadows depends greatly on the visibility algorithm or algorithms used in, for example, the video game. Thus, alternative methods of analyzing the scene to identify each light source that casts one or more shadows of the present invention will be apparent to those of ordinary skill in the art.

Figure 3:
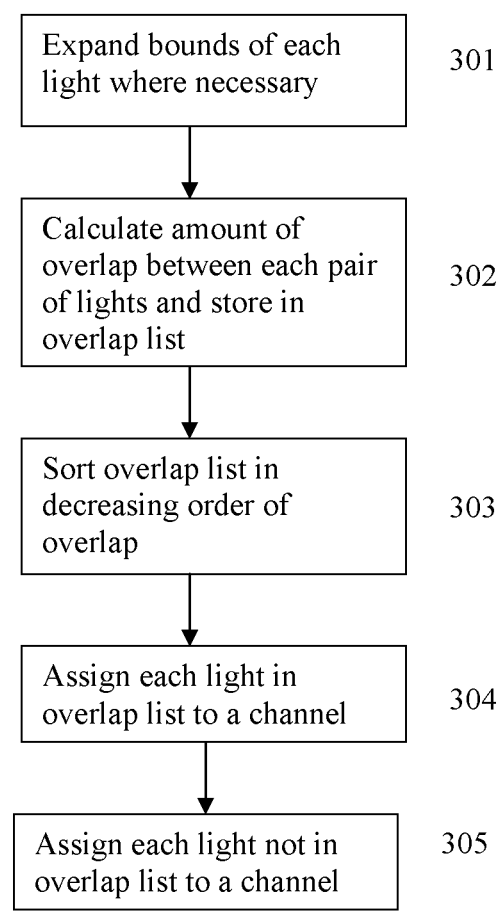
FIG. 3 shows a flowchart overview illustrating how shadow-casting light sources are assigned to a channel in an RBGA shadow mask buffer according to an example embodiment of the present invention.

In step 202, each light source identified in step 201 is assigned to a channel in a four-channel RGBA (Red Green Blue Alpha) shadow mask buffer. FIG. 3 illustrates a flow chart for assigning shadow-casting light sources to such a channel in an example embodiment.

In step 301, the system expands the bounds of each light where necessary. Example embodiments of the present invention perform this step on lights for which it may be deemed more important to minimize overlap. For example, a system may expand the bounds of shadow projection lights, such as lights from security cameras. Example embodiments of the present invention further expand the bounds of each light with square bounds to effectively convert the bounds into spherical bounds. Example embodiments of the present invention further expand the bounds of each light by a small amount to minimize overlap in general.

In step 302, the system calculates the amount that each light overlaps with each other light and stores this data into an overlap list. Thus, the overlap list contains information about every pair of lights that overlap and the amount by which they overlap. In example embodiments, information about any pair of lights that do not overlap (i.e., for which the overlap amount is zero) is not stored in the overlap list. In step 303, the system sorts the overlap list in order of decreasing overlap amount.

As an example, suppose that a scene contains six shadow-casting lights: L1, L2, L3, L4, L5, and L6. Suppose further that lights L1 and L3 overlap by 5 units, L1 and L4 overlap by 8 units, L3 and L4 overlap by 4 units, L1 and L5 overlap by 3 units, L1 and L6 overlap by 6 units, and L2 does not overlap with any other lights. In this example, the sorted overlap list would show: L1-L4 (8), L1-L6 (6), L1-L3 (5), L3-L4 (4), and L1-L5 (3).

In step 304, the system traverses through the ordered overlap list, assigning lights to a channel. For each of the two lights in the list item, if the light has not already been assigned to a channel, then the system assigns the light to the channel to which it least overlaps with other lights of the same channel.

Returning to the example above, then, in an embodiment, the system first considers the list item "L1-L4 (8)". Since all channels would be empty, the system may assign, for example, L1 to the first channel and L4 to the second channel.

In an embodiment, the system next considers the list item "L1-L6 (6)". Since L1 would already be assigned (to the first channel), the system would consider only L6. In this example, since L6 overlaps on the first channel with L1 by a value of 6, and does not overlap with any other lights, the system may assign, for example, L6 to the second channel.

In an embodiment, the system next considers the list item "L1-L3 (5)". Since L1 would already be assigned (to the first channel), the system would consider only L3. In this example, since L3 overlaps on the first channel with L1 by a value of 5, and L3 overlaps on the second channel with L4 by a value of 4, the system may assign L3 to, for example, the third channel.

In an embodiment, the system next considers the list item "L3-L4 (4)". Since L3 and L4 would each already be assigned (to the third and second channels, respectively), the system would not assign either light from this list item.

In an embodiment, the system next considers the list item "L1-L5 (3)". Since L1 would already be assigned (to the first channel), the system would consider only L5. In an example, since L5 only overlaps on the first channel with L1 by a value of 3, the system may assign L5 to the second channel.

In step 305, the system assigns lights that do not overlap with any other lights to a channel. These non-overlapping lights (like L2 in the example above) may be assigned to any channel (for example, the first channel).

In step 203, the system computes the overlapping shadow effects by accumulating each shadow into the shadow mask buffer. Since each shadow is cast from a single light source, and since each light uses a specific channel, each shadow is rendered into the channel associated with the light source from which it casts. In this way, shadows cast from different lights do not unintentionally interfere with each other since they are rendered into their corresponding channel of the shadow mask buffer. Shadows cast from the same light will correctly interact without causing a double shadow effect since they both render into the same channel of the shadow mask buffer. Due to the channel assignment technique described in steps 301 to 305, even if two different lights have the same channel, the likelihood that they unintentionally interfere is minimized in an embodiment of the present invention.

Figure 4:
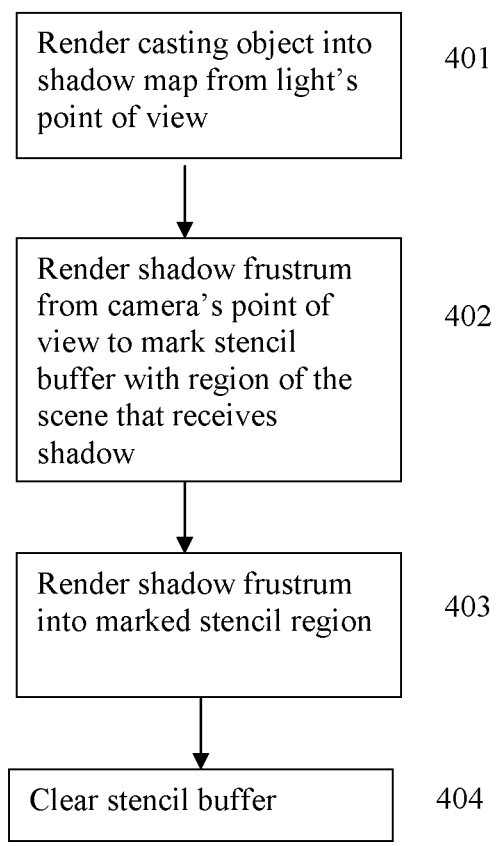
FIG. 4 shows a flowchart overview illustrating how a shadow may be accumulated into the shadow mask buffer according to an example embodiment of the present invention.

FIG. 4 shows a flowchart overview illustrating how one shadow may be accumulated into the shadow mask buffer according to an example embodiment of the present invention. The process shown in FIG. 4 may be repeated for each shadow in the scene.

In step 401, the shadow casting object is rendered from the light's point of view into a shadow map using standard shadow-map rendering techniques.

In step 402, the shadow frustum for the shadow casting object is rendered using the stencil buffer from the camera's point of view. Depending on, for example, the position of the camera, example embodiments of the present invention may use the ZPass and ZFail techniques to accomplish this step. ZPass can be accelerated further on most hardware due to high speed culling based on the Z buffer, however it does not correctly handle intersection with the main scene's point of view. Under these scenarios, ZFail is employed. The result of both of these techniques is to mark the stencil buffer with the region of the scene that could receive the shadow.

In step 403, a pixel shader renders the shadow frustum into the marked stencil region using standard shadow mapping techniques. Despite using standard shadow mapping techniques, however, each shadow is necessarily rendered into the shadow mask buffer channel associated with the light that casts the shadow. Thus, each shadow is additively blended, allowing dynamic and static shadows to perfectly interact.

In example embodiments, the pixel shader may employ complex filtering techniques known in the art, such as percentage closer filtering (PCF) or Variance Shadow Maps (VSM) to filter soft, realistic shadows. To increase the performance of PCF, one may also render a smaller sized edge buffer that identifies which regions of the shadow map is likely to be in the penumbra. In an embodiment, the pixel shader then employs this edge buffer so that it only needs to apply high quality PCF where needed.

In example embodiments, the pixel shader responsible for step 403 is separate from the main pixel shader available in the art. This separate pixel shader may be specifically adapted to render a shadow map into the shadow mask buffer, making it much more efficient than the main pixel shader.

In step 404, the stencil buffer is cleared so that other shadows may utilize the stencil buffer.

Returning to FIG. 2, in step 204, the main pixel shader runs. Example embodiments of the present invention support PS2.0 or greater and require that the hardware support fragment programs.

In example embodiments of the present invention, the main pixel shader samples the shadow mask buffer and an attenuation map to compute light attenuation and shadows in a fragment program. In example embodiments, the attenuation map may be stored in a single channel of a DXTx texture. In this way, a single texture may store attenuation maps for multiple lights, one for each of its channels.

In example embodiments of the present invention, the main pixel shader determines how each given light source affects a given pixel, then accumulates the result for all light sources. A given light source may affect a given pixel by, for example, a Blinn-Phong term (to facilitate normal mapping quality, even on specular objects), multiplied by the light's (possibly HDR) color, multiplied by any attenuation on the light, where light attenuation may include shadows in the shadow mask buffer. In example embodiments of the present invention, the main pixel shader uses an attenuation channel selector for each light to select the corresponding channel from the attenuation texture. In an embodiment, the pixel uses a shadow channel selector for each light to select the corresponding channel of the shadow mask buffer. For example, light attenuation for a single light might be calculated as:

(Light Attenuation)=saturate (dot (attenuation channel selector, attenuation texture)–dot (shadow channel selector, shadow mask buffer))

For example, in the above formula, the channel selectors are 4 component vectors that are set to (1,0,0,0) for the first channel, (0,1,0,0) for the second channel, (0,0,1,0) for the third channel and (0,0,0,1) for the fourth channel. The dot product of the attenuation channel selector and attenuation texture represents the light attenuation and static shadows. The dot product of the shadow channel selector and shadow mask buffer represents light that is blocked by dynamic shadows from the shadow mask buffer. In an embodiment, the applicable shadow mask buffer channel is the one corresponding to the light for which the shadow mask is being applied. If the corresponding channel in the shadow mask buffer indicates that the pixel is in shadow, then the light attenuation is zero. In this case, the light does not affect the pixel.

In example embodiments of the present invention, the main pixel shader renders lighting and accumulated shadowing effects of multiple lights in one pass (limited by factors such as, for example, how many light data textures the pixel shader can read), while simultaneously improving quality and maintaining good performance.

Example embodiments of the present invention may provide advantages over prior shadowing techniques. First, accurate per light dynamic shadows are enabled. Second, normal mapping quality is facilitated, even on highly specular objects such as water and metal. Third, full range and precision of shadows from high dynamic range (HDR) light sources are provided, even if lights change intensity and color during game play. Fourth, all lights can change intensity and color at runtime while maintaining full shadows. Fifth, the system requires a low memory footprint.

It should be understood that there exist implementations of other variations and modifications of the invention and its various aspects, as may be readily apparent to those of ordinary skill in the art, and that the invention is not limited by specific embodiments described herein. Features and embodiments described above may be combined in various ways. It is therefore contemplated to cover any and all modifications, variations, combinations or equivalents that fall within the scope of the basic underlying principals disclosed and claimed herein.

It will be appreciated that all of the disclosed methods, and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor which, when executing the series of computer instructions, performs or facilitates the performance of all or part of the disclosed methods, and procedures.

What is claimed is:

1. A method for simulating shadows in a scene, comprising:
   identifying two or more light sources, each light source casting at least one shadow from one or more objects, wherein for each of the two or more light sources identifying by:
   marking each respective light source to indicate if the respective light source should cast at least one shadow,
   determining which binary space partitioning (BSP) leaves receive light from the respective light source,
   computing a list of the two or more light sources that should affect the respective BSP leaves,
   traversing, during a scene, all visible BSP leaves, and updating the list of the two or more light sources that should be shadow-casting that affect those visible BSP leaves;
   assigning each of the two or more light sources to one of at least one channel in a shadow mask buffer;
   accumulating the one or more shadows into the shadow mask buffer;
   combining the accumulated shadows with corresponding lights to render the scene, and
   generating the scene with shadows using a pixel shader in a processor.

2. The method according to claim 1, wherein the scene is partitioned by one or more planes that define two or more convex sections within the scene.

3. The method according to claim 2, further comprising identifying which one or more of the convex sections within the scene are visible.

4. The method according to claim 3, wherein identifying the two or more light sources that cast the one or more shadows from the one or more objects comprises maintaining a list associating one or more of the visible convex sections in which the one or more objects appear with one or more of the light sources which cast the shadows from the one or more objects.

5. The method according to claim 1, wherein the shadow mask buffer is a four-channel buffer.

6. The method according to claim 5, wherein the four-channel buffer is an RBGA buffer.

7. The method according to claim 1, wherein assigning each of the two or more light sources to one of the at least one channels in the shadow mask buffer comprises:
   for each pair of the light sources that overlap, calculating an amount by which the pair overlap;
   for each pair of the light sources that overlap, storing a list item comprising identifiers for each of the light sources in the pair and the calculated amount by which the pair overlap into an overlap list;
   sorting the overlap list by the calculated amount by which the stored pairs overlap.

8. The method according to claim 7, further comprising, for each list item in the overlap list:
   for each light source identified in the list item that has not been assigned to any channel, assigning the light source to the one of the channels of which the light source has the least overlap with other light sources of the same channel.

9. The method according to claim 8, further comprising, for each light source not identified in any list item, assigning the light source to any of the channels.

10. The method according to claim 7, wherein assigning each of the one or more light sources to one of the at least one channels in the shadow mask buffer further comprises expanding bounds associated with each of the one or more light sources.

11. The method according to claim 10, wherein expanding bounds associated with each of the one or more light sources comprises converting square bounds to spherical bounds.

12. The method according to claim 1, wherein accumulating the one or more shadows into the shadow mask buffer comprises, for each of the shadows:
    rendering the shadow casting object into a shadow map; and
    rendering the shadow frustum using a stencil buffer.

13. The method according to claim 12, wherein the shadow casting object is rendered into a shadow map from a point of view of the light source that casts the shadow.

14. The method according to claim 12, wherein the shadow frustum is rendered using a stencil buffer from the point of view of a camera.

15. The method according to claim 12, wherein accumulating the one or more shadows into the shadow mask buffer further comprises, for each of the shadows:
    marking a region of the stencil buffer that may receive the shadow; and
    rendering the shadow frustum into the marked region of the stencil buffer.

16. The method according to claim 15, wherein rendering the shadow frustum into the marked region of the stencil buffer is accomplished by a pixel shader.

17. The method according to claim 12, further comprising clearing the stencil buffer.

18. The method according to claim 1, further comprising:
    for each of one or more pixels, computing an effect of each of the light sources upon the pixel; and
    accumulating the computed effects for all of the one or more pixels.

19. The method according to claim 18, wherein computing the effect of each of the light sources upon each of the one or more pixels comprises sampling the shadow mask buffer.

20. The method according to claim 19, wherein computing the effect of each of the light sources upon each of the one or more pixels further comprises sampling a light attenuation map.

21. The method according to claim 18, wherein computing and accumulating the effects of each of the light sources upon each of the pixels is performed by a pixel shader.

22. The method according to claim 21, wherein the pixel shader employs filtering techniques to filter one or more of the computed effects.

23. The method according to claim 21, wherein the pixel shader computes and accumulates the effects of each of the light sources upon each of the pixels in a single pass.

24. A system for simulating shadows in a scene, comprising:
    at least two light sources, the at least two light sources casting at least one shadow from at least one object;
    an arrangement for identifying the light sources, wherein for each of the light sources, the arrangement identifies by:
        marking each respective light source to indicate if the respective light source should cast at least one shadow,
        determining which binary space partitioning (BSP) leaves receive light from the respective light source,
        computing a list of the two or more light sources that should affect the respective BSP leaves,
        traversing, during a scene, all visible BSP leaves, and updating the list of the two or more light sources that should be shadow-casting that affect those visible BSP leaves;
    at least one channel, the at least one channel having a shadow mask buffer, the at least two light sources being assigned to the at least one channel,
    wherein the at least one shadow is accumulated into the shadow mask buffer, and the accumulated shadows being combined with the corresponding lights to render the scene.

25. A non-transitory computer-readable storage medium encoded with instructions to be executed by a processor, the instructions which, when executed by the processor, cause the performance of a method for simulating shadows in a scene, comprising:
    identifying two or more light sources that cast one or more shadows from one or more objects, wherein for each of the two or more light sources identifying by:
        marking each respective light source to indicate if the respective light source should cast at least one shadow,
        determining which binary space partitioning (BSP) leaves receive light from the respective light source,
        computing a list of the two or more light sources that should affect the respective BSP leaves,
        traversing during a scene all visible BSP leaves, and updating the list of the two or more light sources that should be shadow-casting that affect those visible BSP leaves;
    assigning each of the two or more light sources to one of at least one channels in a shadow mask buffer; and
    accumulating the one or more shadows into the shadow mask buffer.

* * * * *